(12) United States Patent
Whitehead

(10) Patent No.: US 7,623,466 B2
(45) Date of Patent: Nov. 24, 2009

(54) SYMMETRIC CONNECTION DETECTION

(75) Inventor: Bradley James Whitehead, Kingston (CA)

(73) Assignee: Alcatel Lucent, Paris (FR)

( * ) Notice: Subject to any disclaimer, the term of this patent is extended or adjusted under 35 U.S.C. 154(b) by 498 days.

(21) Appl. No.: 11/407,221

(22) Filed: Apr. 20, 2006

(65) Prior Publication Data

US 2007/0248084 A1    Oct. 25, 2007

(51) Int. Cl.
*H04L 12/26*   (2006.01)
*H04L 12/28*   (2006.01)

(52) U.S. Cl. ........................... 370/250; 370/389
(58) Field of Classification Search ............. 370/389
See application file for complete search history.

(56) References Cited

U.S. PATENT DOCUMENTS

| | | | | |
|---|---|---|---|---|
| 2003/0003895 A1* | 1/2003 | Wallentin et al. | ............ | 455/410 |
| 2006/0098585 A1* | 5/2006 | Singh et al. | ............. | 370/252 |
| 2006/0126522 A1* | 6/2006 | Oh | ............. | 370/250 |
| 2007/0297349 A1* | 12/2007 | Arkin | ............. | 370/255 |

OTHER PUBLICATIONS

Weaver et al, "Very Fast Containment of Scanning Worms," found at nweaver@icsi.berkeley.edu.
V. Paxson, "Bro: A System for Detecting Network Intruders in Real-Time," Computer Networks, 31 (23-24), pp. 2435-2463, Dec. 14, 1999.

\* cited by examiner

*Primary Examiner*—Daniel J. Ryman
*Assistant Examiner*—John Blanton
(74) *Attorney, Agent, or Firm*—Kramer & Amado, P.C.

(57) ABSTRACT

Symmetric Connection Detection (SCD) is a method of detecting when a connection has been fully established in a resource-constrained environment, and works in high-speed routers, at line speed. Many network monitoring applications are only interested in connections that become fully established, so other connection attempts, such as port scanning attempts, simply waste resources if not filtered. SCD filters out unsuccessful connection attempts using a simple combination of Bloom filters to track the state of connection establishment for every flow in the network. Unsuccessful flows can be filtered out to a very high degree of accuracy, depending on the size of the bloom filter and traffic rate. The SCD methodology can also easily be adapted to accomplish port scan detection, and to detect or filter other types of invalid TCP traffic.

18 Claims, 2 Drawing Sheets

SYMMETRIC CONNECTION DETECTION

FIELD OF THE INVENTION

The invention is directed to communication networks and in particular to symmetric connection detection methods and systems for detecting the beginning and end of a connection establishment session.

BACKGROUND OF THE INVENTION

The current state of sampled network monitoring solutions remains basic, providing limited information to service providers. Many network monitoring applications in use today are only interested in TCP connections that become fully established, so other connection attempts, such as port scanning attempts, simply waste resources if not filtered.

A need has arisen for both the users and network operators to have better mechanisms to monitor network performance, filter network traffic, and troubleshoot network congestion without introducing additional traffic on any communication network. This is especially relevant to Internet providers that must comply with SLAs (Service Level Agreements) provided to customers. As Internet architecture evolves, the SLAs now include requirements on the quality of service such as jitter, throughput, one-way packet delay, and packet loss ratio. Additionally, the need to monitor network traffic is prevalent for the underlying Internet protocol enabling the World Wide Web.

Detailed visibility into individual users and business applications using the global network is essential for optimizing performance and delivering network services to business users. Current network performance monitoring mechanisms perform traffic analysis in a non-invasive way with respect to the observed networking environment. As a result, these mechanisms do not affect the performance of the network while doing the measurements and querying.

For example, Cisco offers the NetFlow traffic analyzer identifies traffic flows based on IP source/destination addresses, protocol ID field, type of service field, and router port. Once identified, statistics can be collected for a traffic flow, and exported via user datagram protocol (UDP) when the flow expires. A NetFlow record contains information about sampled flows that pass through the router and provides a digest of the communications showing hosts that were involved, services that were used, and how much data was exchanged. As another example, Lucent Bell Labs has various research projects in traffic analysis, which are mainly concentrated on collection of TCP/UDP/IP packet headers and off-line traffic analysis, modeling and visualization.

In general, network monitoring tools are able to collect a large amount of data from various information sources distributed throughout the network. For example, Snort Intrusion System for TCP (SIFT), uses an information dissemination server which accepts long-term user queries, collects new documents from information sources, matches the documents against the queries, and continuously updates the users with relevant information. SIFT is able to process over 40,000 worldwide subscriptions and over 80,000 daily documents.

Automated tools for filtering the large amount of information that may be collected are also available. For example, information filtering systems (IFS) require users to provide their profile representing his/her information needs and the system then filters the information relevant to that profile. Detailed visibility into individual users and business applications using the global network is essential for delivering network services tailored to business or individual users. By filtering useful and personalized information, these tools aim at optimizing the daily work of its users.

Also, tracking and monitoring flows is particularly relevant for network vendors who wish to provide access to information on their high-end routers; they must therefore devise scalable and efficient algorithms to deal with the limited per-packet processing time available.

These tools are also useful to network providers, as it allows them to filter information relevant to implementing cost saving measures by optimizing network resources utilization, detecting hi cost network traffic, or-tracking down anomalous activity in a network, etc. For example, in order to protect their network and systems today, network providers deploy a layered defense model, which includes firewalls, anti-virus systems, access management and IDS . The capacity to detect as fast as possible the propagation of malware and to react efficiently to on-going attacks inside the network in order to protect the network infrastructure is becoming a real challenge for network operators. These systems are efficient once they detect correctly the illegitimate traffic, based on flow analysis or/and on deep packet analysis. Flow-based analysis includes methods for tracking malicious continuous flows by detecting unusual patterns. It relies usually on technologies as Netflow, IPFix, and RTFM implemented into routers.

Many intrusion detecting systems (IDS) and network security monitoring (NSM) systems are interested in TCP connections that become fully established. Therefore, other connection attempts, such as port scanning attempts, simply waste resources if not filtered. Also, most current IDS and NSM systems operate based on restricting clients to a specified number of connections in a certain amount of time seconds which may result in false-positive detections for active users. For example, SNORT is a lightweight network intrusion detection system (IDS) that uses a flexible rules language to describe traffic that it should collect or pass, and a detection engine with a modular plug-in architecture. SNORT is capable of performing real-time traffic analysis and packet logging on IP networks, and detecting a variety of attacks and probes, such as buffer overflows, stealth port scans, OS fingerprinting attempts, and more.

SIFT is a hardware based IDS, which selectively forwards IP packets that contain questionable headers or defined signatures to a PC, where complete rule processing is performed, thus alleviating the need for most network traffic from being inspected by software. Statistics, like how many packets match rules, are used to optimize rule processing systems.

Another method for scanning the ports on a network element for intrusion detection, rather than scanning established connection is described in the paper "Very Fast Containment of Scanning Worms" by Nicholas Weaver, et al. The system described in this article uses an associative cache to track "external connections", and requires a notion of "internal" and "external" IP addresses, which would result in inefficient operation on edge or core routers.

V. Paxson describes a system for monitoring network traffic in a paper published in Computer Networks, 31(23-24), pp. 2435-2463, 14 Dec. 1999, entitled "Bro: A System for Detecting Network Intruders in Real-Time". Bro uses an "event engine" that reduces a kernel filtered network traffic stream into a series of high-level events, and a "policy script interpreter" that interprets event handlers written in a specialized language used to express site's security policy. Event handlers can update state information, synthesize new events, record information to disk, and generate real-time notifications. Again, the Bro system focuses on detecting port scans, not detecting established connections, and as such is not accurate enough in filtering the malicious traffic. While it does track the number of failure attempts, the Bro system is also limited to lower traffic rates (1 Gbps).

The existing flow traffic monitoring tools are not able to trace the flow establishment and duration with accuracy. Traffic flow monitoring or filtering systems that enable identification of established connections and measurement of flow duration with a high degree of accuracy are very important to network operators/providers, especially in a resource-constrained environment. There is a need to provide such connection detection systems that operate with high accuracy and provide instant feedback while operating in high-speed routers at line speed.

SUMMARY OF THE INVENTION

It is an object of the invention to provide a method of traffic flows monitoring that alleviates totally or in part the drawbacks of the current monitoring mechanisms.

It is another object of the invention to provide a method and system for monitoring established flows in a resource limited environment, which measurement is performed in real-time.

Accordingly, the invention provides a system for identifying establishment of a connection between a source host with a source address (Src) and a destination host with a destination address (Dst) in a data network, comprising a flow descriptor calculating unit for calculating a flow descriptor unique to the connection based on connection set-up datagrams exchanged between the source host and the destination host, wherein the flow descriptor is unique to the traffic flow; storage means for storing the flow descriptor based on a relationship between the Src and Dst; an access interface to the storage means for providing a flow present indication if the flow descriptor is found in the storage means; and a controller for controlling operation of the descriptor calculating unit and the access interface and determining that the connection has been established based on the relationship and on the flow present indication.

The invention also provides a method for identifying establishment of a connection in a data network between a source host with a source address (Src) and a destination host with a destination address (Dst), comprising: a) detecting a first connection set-up datagram transmitted from the source host to the destination host and identifying the connection set-up datagram as a connection request; b) detecting a second connection set-up datagram transmitted from the destination host to the source host and identifying the second connection set-up datagram as a request acknowledged datagram; c) generating a connection established indication if both the connection request datagram and the request acknowledged datagram have been identified in this order.

Still further, the invention provides a method for identifying release of a connection in a data network between a source host with a source address (Src) and a destination host with a destination address (Dst), comprising: a) detecting a first connection release datagram transmitted from the source host to the destination host and identifying the connection release datagram as a release connection request; b) detecting a second connection release datagram transmitted from the destination host to the source host and identifying the second connection release datagram as a request acknowledged datagram; c) issuing a connection release indication if both the connection release datagram and the request acknowledged datagram have been identified in this order.

Advantageously, the method of the invention is designed to work in a resource limited environment while it provides accurate results; tests have shown over 99% accuracy has been achieved. Queries for the establishment of a specified flow may be preformed in real-time, without any need for further processing of data. The system of the invention may be scaled to fit different levels of memory or processing capacity, to the expense of accuracy.

Still further, network operators can use the method of the invention for tracking the distribution of flows in a network with a view to detecting anomalies and to balance the traffic. A service provider can then identify established flows and monitor their parameters such as bandwidth, duration, users profiles, etc. This information, collected at flow granularity, may then be used for detecting anomalies, traffic balancing, devising scalable and efficient algorithms to deal with the limited per-packet processing time available, delivering network services tailored to business or individual users based on the users profiles, etc.

Per traffic flow monitoring according to the invention may also be advantageously used by the network providers, as it allows implementing cost saving measures, detecting high-cost network traffic, or tracking down anomalous activity in a network, etc. For example, the network providers may filter data pertinent to established flows longer than 15 minutes and which occupy over 50% of the total bandwidth, and concentrate on identifying if there is any problem with such flows. Or, suspicious activities may be detected based on flows duration. For example, a flow that uses a moderate amount of bandwidth (2 Mbps) may not be suspicious if it has been active for 30 seconds, but could be, if it has been active for 45 minutes.

Knowing which flows are established in the network at any time also enables network monitoring software vendors to add features to their software, which will only work when accurate flow information is available from the router/network device/s.

BRIEF DESCRIPTION OF THE DRAWINGS

The foregoing and other objects, features and advantages of the invention will be apparent from the following more particular description of the preferred embodiments, as illustrated in the appended drawing, where.

DETAILED DESCRIPTION

Figure 1:
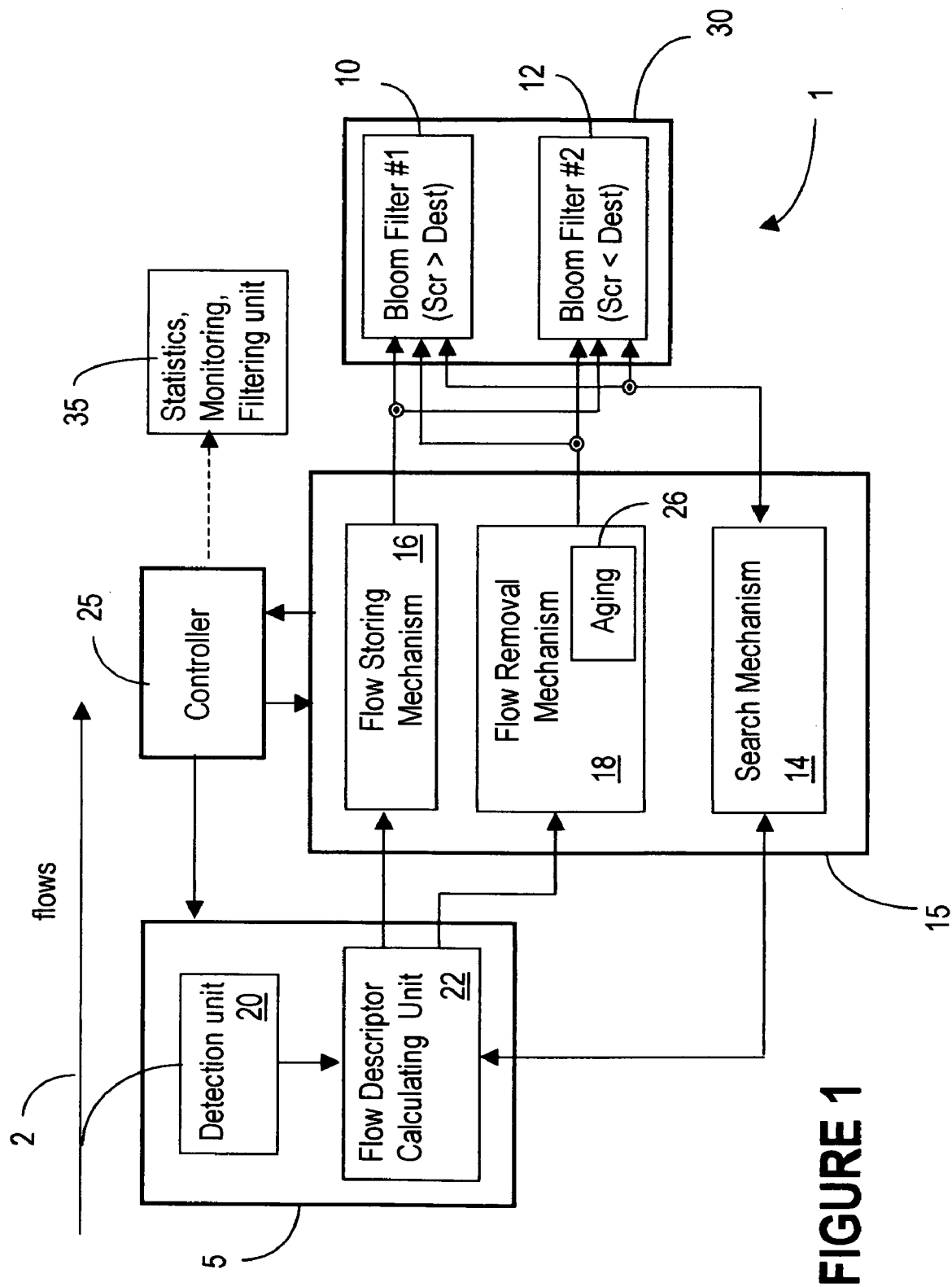
FIG. 1 illustrates a block diagram of the symmetric flow detection system according to an embodiment of the invention.

As indicated above, many current network monitoring applications are only interested in connections that become fully established; other connection attempts simply waste resources if not filtered. The present invention provides a connection detection method and system for detecting when a session has been fully established in a resource-constrained environment. The system of the invention is applicable preferably to connection-oriented networks; however, it may also detect if two devices communicate to each-other in any type of network. The symmetric connection detection (SCD) method and system of the invention are designed to work in high-speed routers, at line speed, and track the state of connection establishment for every flow in the network.

It is to be noted that the term "fully established connection" refers to a connection established through bi-directional signaling between a source and a destination host. According to the invention, a connection between a source and a destination host is considered fully established once a connection request datagram transmitted from the source host to the destination host is followed by a request acknowledged datagram transmitted from the destination host to the source host. Once this sequence of datagrams is detected, the SCD system provides a connection established indication to interested entities in the network for triggering traffic flow monitoring activities for the respective connection. The term "traffic flow" is used for designating the traffic (data) that flows along the connection from the source host to the destination host.

In general, a connection is initiated at a source node by transmitting a connection request datagram to an intended destination node; the destination responds with a request acknowledged datagram if it accepts the request. For the example of TCP connections, at initiation, a destination host receives a SYN (synchronize/start) packet from a source host and sends back a SYN/ACK (synchronize acknowledge) packet, to inform the source that the receiver (destination host) is ready to accept traffic. The destination host must then receive an ACK (acknowledgement) of the SYN before the connection is established. An incomplete sequence indicates attacks, incomplete connection, or port scans. This is referred to as the "TCP three-way handshake."

The method and system of the invention may also be used for detecting the end (reset) of a connection, by identifying in the flow datagrams that request a connection release and confirm release of the respective connection. In the example of TCP connections, at termination, a destination host receives a FIN packet from a source host and sends back a FIN/ACK packet, to inform the source that the receiver is ready to disconnect. The destination host must then receive an acknowledgement of the FIN, i.e. an ACK before the connection is released.

These TCP packets may be recognized by the status of the control bits/flags ACK, RST, SYN, FIN, ACK in the header of the TCP packets. Flow identification unit 5 includes a detection unit 20 that recognizes the packet type according to which flag bits are set. For example, SYN and ACK packets have the respective SYN or ACK flag set to "1", and a SYN/ACK packet has the flags SYN and ACK set to "1". As such, the SYN and SYN/ACK packets are collectively designated as SYN packets as they have the SYN flag set; the difference is that they travel in opposite direction during the TCP three-way handshake signaling.

It is also to be noted that in the following, the invention is described for the TCP flows by way of example; as indicated above, the invention is applicable preferably to connection-oriented networks but it may also detect when two devices communicate to each-other in any type of network. Also, the ensuing description is provided for connection establishment detection; identifying when a connection is released is performed in a similar way. We also assume that the traffic flows between the source and destination along an IP connection; however, as indicated above the invention is not limited to this protocol.

FIG. 1 illustrates a block diagram of the symmetric connection detection (SCD) unit a, according to an embodiment of the invention. System 1 comprises a flow identification unit 5, filter block 30, filter access interface 15 and a controller 25. We assume by way of example that a forward flow 2 needs to be established between a source host having an address Src, and a destination host, having an address Dst. In the following, the term "forward" is used to designate the direction of traffic flows shown by the arrow in FIG. 1; the traffic flow in the opposite direction is designated using the term "reverse". "Forward" and "reverse" are relative terms, used for better explaining the invention, and they should not be construed as limiting the scope of the claims.

Flow identification unit 5 monitors flows 2 with a view to identify the datagrams (e.g. packets) that initiate/release a connection. In this example, the SYN, ACK and FIN travel in the forward direction between the source and the destination, while the SYNACK and FINACK packets travel in the reverse direction, from the destination to the source. For the SYN, ACK and FIN packets which travel in the forward direction, the address inserted in the source address field is Src and the address inserted in the destination field is Dst. For the SYN-ACK and FINACK packets which travel in the reverse direction, the address inserted in the source field address if these packets is Dst, and the address inserted in the destination field is Src.

For detecting connection establishment, detection unit 20 detects and selects the SYN and SYN/ACK packets, while for the connection release detection unit 20 detects and selects the FIN and FIN/ACK packets, by checking if the respective SYN or FIN flag is set to "1" in the header. Detection unit 20 can be implemented in several ways, depending on the design of the network element where the flow monitoring takes place. A simple software module can be used to test the TCP flags field. Alternatively, a hardware based solution could use a content addressable memory (CAM) to detect these packets, etc.

Flow identification unit 5 also includes a flow descriptor calculating unit 22 which generates a connection identifier, herein also called a flow descriptor. The flow descriptor uniquely identifies a traffic flow based on flow-specific data extracted from the SYN packets; the fields used for generating the flow descriptors must be selected so as to obtain a unique descriptor for each flow. For example, the descriptor may be calculated based on the packet source and destination IP addresses, source and destination ports and a protocol number (unless only TCP flows are tracked, then the protocol number can be ignored).

Filter block 30 comprises two Bloom filters 10, 12 used for storing the flow descriptor calculated by unit 22, according to the relationship between the source and the destination addresses in the packets used to generate the respective descriptor. In the block diagram of FIG. 1, a first bloom filter 10 stores the flow descriptors for SYN packets with Src >Dst, and the second Bloom filter 12 stores SYN packets with Dst>Src. In principle, a flow descriptor generated from a SYN packet with Src>Dst is used to search the Bloom filter 12, i.e. the filter for the opposite direction. Therefore, one of the filters is also referred to as "the filter for the opposite direction" with respect to the other filter.

The flow descriptors are stored in Bloom filters 10, 12 in a very compressed format, so that the memory space used is minimal. The invention is not restricted to use of counting Bloom filters for storing the flow descriptors; it is possible that higher performance could be achieved from the use of other data structures such as space code Bloom filters. For generalization, filters 10 and 12 are designated using the term "flow descriptor container" or "flow container".

An empty Bloom filter is a bit array of m bits, all set to 0. Bloom filters use k different hash functions, each of which maps a key value to one of the m array positions. In order to add an "element" in the filter, the element has to be fed to each of the k hash functions, to get k array positions in the filter and the bits in these positions are set to 1. To test whether an element is a member of the set (to query an element), the element is again fed to each of the k hash functions to get k array positions. If all of the bits at these positions are zero, the element is not in the set—if it were, then all the bits would have been incremented when it was inserted. If all elements in these k positions are not zero, then either the element is in the set, or the bits have been set during the insertion of other elements.

When counting Bloom filters are used for storing the flow descriptors, calculating unit 22 applies k hashes to data from the packet header of the SYN packets. Once the flow hashes are calculated, unit 22 identifies which counters of Bloom filters should be incremented for storing a flow identified by the flow descriptor. Using Bloom filters has the advantage that it reduces the memory requirements of storing the flows from directly proportional to the number of flows, to constant, and so it is easy to place a cap on the total memory used. Bloom filters also allow memory to be used far more efficiently by storing both the flow identification information as just a few bits. In addition, Bloom filters can store the information in a very condensed form. The size of the Bloom filters, range of the count, and number of hashes used are all parameters of the method, which affect memory usage, processing required, and accuracy.

Controller 25 examines the header of the SYN packets selected by detection unit 20 and compares the source address Src with the destination address Dst of each SYN packet. Controller 25 then instructs filter access interface 15 to store the flow descriptor according to the result of this comparison in one of Bloom filters 10 or 12, and also only if the descriptor is not already present in the corresponding Bloom filter. The packets that have Src=Dst are assumed to be corrupt, and are ignored.

There are three main operations performed on the Bloom filters from Bloom filters access interface 15, namely searching filters for flows as shown by search (or query) mechanism 14; adding a flow to a selected filter, shown by flow storing (or adding) mechanism 16; and removing flows from the filters as shown by flow removal mechanism 18. Adding and searching flows operations are performed using the flow descriptor identified by the flow descriptor calculating unit 22.

On receipt of a flow descriptor generated from a SYN packet, the search mechanism 14 queries the Bloom filter for the opposite direction to determine if the connection has been established or not. For example, when the SYN packet for a flow $F_0$ is received, if Src>Dst, the search mechanism 14 queries the Bloom filter 12 for flow descriptor $D_0$. If the search mechanism finds descriptor $D_0$ in the Bloom filter 12, it provides controller 25 with a "flow present" indication, so that controller 25 recognizes that flow $F_0$ has been established. This is because the flow descriptor found in the filter 12 corresponds to the SYN packet for flow $F_0$, and the SYN packet that generated the currently calculated $D_0$ is a SYN-ACK packet confirming flow establishment. On the other hand, if search mechanism 14 does not find descriptor $D_0$ in the Bloom filter 12, control unit 25 instruct flows storing mechanism 16 to add flow descriptor $D_0$ into filter 10.

Similarly, when a SYN packet for flow $F_1$ is received, and the control unit determines that for this packet $Src_1 > Dst_1$, the search mechanism 14 queries the Bloom filter 10 for flow descriptor $D_1$. If search mechanism 14 finds descriptor $D_1$ in the Bloom filter 10, it provides controller 25 with a flow present indication, so that controller 25 recognizes that flow $F_1$ has been established. If search mechanism 14 does not find descriptor $D_1$ in the Bloom filter 10, controller 25 instructs flow storing mechanism 16 to add flow descriptor $D_0$ into the filter 12.

Flow storing mechanism adds a flow descriptor to a Bloom filter only if the respective descriptor is not yet stored in that filter. Alternatively, the flow descriptor may not be added to the filter for the respective direction after a positive search result in the filter for the opposite direction. In still another alternative embodiment, the descriptor in the filter for the respective direction may be removed after a positive search result in the filter for the opposite direction. These alternative variants of the SCD system or a combination thereof can be adopted depending on the accuracy the network/service provider intends to obtain, the configuration of the NE where the SCD system, taking also into account the ensuing complexity of the SCD system configuration.

Connection information is then used to filter or pass packets for that flow to a higher level monitoring system, or the statistics may be simply logged and provided to network operators, as generically shown by the unit 35. Alternatively, the statistics may be simply logged and provided to network operators.

The Bloom filters 10, 12 are periodically aged to remove stale connection attempts, and keep accuracy high. The aging process, shown at 26, can be a simple clearing of the filter after a certain time. A more complex aging process 26 may also be provided, involving using multiple rotating Bloom filters (not shown). Rotating the filters would increase accuracy slightly, as some in-progress connection information will be lost when the filters are cleared.

Preliminary simulations and theoretical expectations show that SCD system provides results close to 100% accurate (99.5%).

Slight modifications of SCD can be used for port scan detection and detection of some attacks. The Bloom filters can be modified to counting bloom filters, and the hashes can be based on IP addresses only. In this way it would be possible to track the number of failed connection attempts on a per-IP basis, with some errors.

Figure 2:
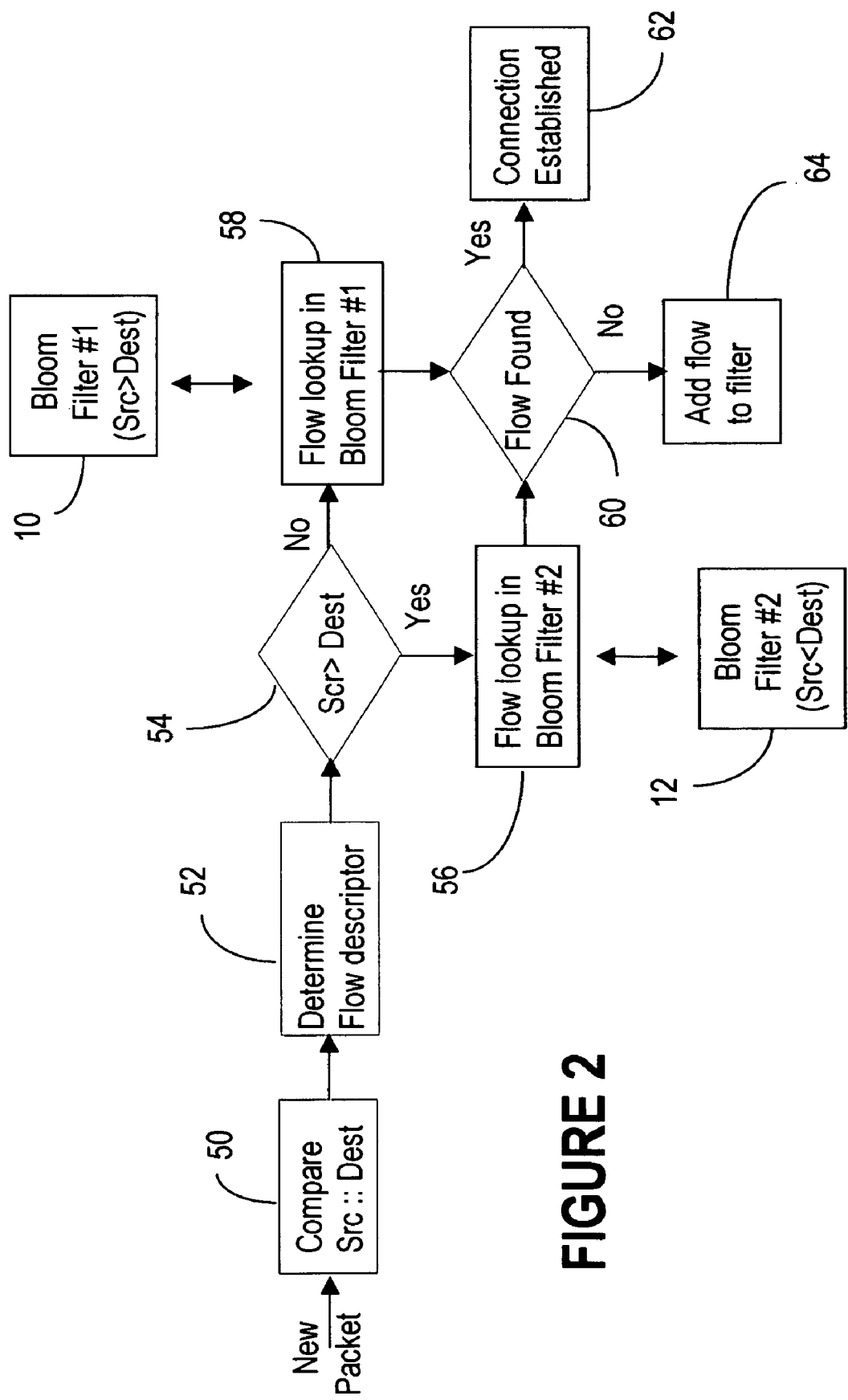
FIG. 2 illustrates the operation of the symmetric connection detection method according to an embodiment of the invention.

SCD (symmetric connection detection) processes all TCP packets with the SYN flag set. FIG. 2 shows the operation of the SCD method according to an embodiment of the invention, where the main steps are as follows:

Step 50: Compare Addresses. Source (Src) and destination (Dst) addresses of the TCP SYN packet are compared (Src:: Dst) to establish which address is greater, source or destination. These addresses are compared as unsigned integers. If they are equal, the packet is assumed to be corrupt, and is ignored.

Step 52: Determine Flow Descriptor. The flow descriptor is calculated based on some fields from the packet header, selected to obtain a descriptor that is unique to that flow. As indicated above by way of example, the descriptor may be calculated based on the packet source and destination IP addresses, source and destination ports and a protocol number, etc.

Steps 54, 56, 58: Flow Lookup. The Bloom filters are queried to see if a SYN packet was sent in the opposite direction for this flow. For example, if the source address in the header of the incoming packet is greater than the destination address (Src>Dst), branch "Yes" of decision block 54, then the Bloom filter 12 for the opposite direction is queried, step 56. If the destination address in the header of the incoming packet is greater than the source address (Dst>Src), branch "No" of decision block 54, then the Bloom filter 10 for the opposite direction is queried, step 58.

Steps 60, 62: Connection Established. If the respective queried Bloom filter 10, 12 returns a positive result to the query, as shown by the branch "Yes" of decision block 60, then it can be concluded that the connection is established, with a high degree of accuracy.

Steps 60, 64: Add Flow Descriptor to Filter. If the queried Bloom filter returns a negative result, as shown by the branch "No" of decision block 60, the corresponding Bloom filter is updated with the flow. For example, if the source address in the header of the incoming packet is greater than the destination address (Src>Dst), then the filter queried in step 56 is Bloom filter 12, and the flow is added in step 64 to Bloom filter 10. If the incoming packet has Src<Dst, then the filter queried in step 58 is Bloom filter 10, and the flow is added in step 64 to Bloom filter 12.

The SCD system enables filtering out unsuccessful flows with a very high degree of accuracy, depending on the size of the bloom filter and traffic rate, 99.5% is typical. The SCD method and system can also easily be adapted to accomplish port scan detection, and to detect or filter invalid TCP traffic.

I claim:

1. A system for identifying establishment of a connection between a source host with a source address (Src) and a destination host with a destination address (Dst) in a data network, comprising:
   a flow identification unit for calculating a flow descriptor unique to said connection based on connection set-up datagrams exchanged between said source host and said destination host;
   storage means, for storing said flow descriptor based on a relationship between said Src and Dst;
   an access interface to said storage means for providing a flow present indication if said flow descriptor is found in said storage means; and
   a controller for controlling operation of said flow identification unit and said access interface and determining that said connection has been established based on said relationship and on said flow present indication,
   wherein said storage means comprises a first container for storing flow descriptors obtained from connection set-up datagrams with a Src>Dst, and a second container for storing flow descriptors obtained from connection set-up datagrams with a Src<Dst.

2. The system of claim 1, wherein said flow identification unit comprises:
   a detection unit for detecting a connection set-up datagram for said connection; and
   a flow descriptor calculating unit for calculating said flow descriptor from address data extracted from said connection set-up datagram.

3. The system of claim 1, wherein said access interface comprises a flow storing mechanism for storing said flow descriptor in said first container if said flow descriptor is not already stored in said second container.

4. The system of claim 1, wherein said access interface comprises: a search mechanism for performing a look-up in said second container for a flow descriptor obtained from connection set-up datagrams with a Src >Dst, and performing a look-up in said first container for a flow descriptor obtained from connection set-up datagrams with a Src <Dst.

5. The system of claim 1, further comprising a flow removal mechanism for removing all flow descriptors from said storage means after a preset amount of time.

6. The system of claim 1, further comprising flow monitoring means for monitoring said connection once said control unit acknowledges that said connection has been established.

7. The system of claim 1, wherein said flow identification unit is capable of calculating said flow descriptor from connection release datagrams, and wherein said control unit is capable of establishing that a respective connection has been released based on said flow descriptor calculated from the connection release datagrams.

8. The system of claim 1, wherein said containers are Bloom filters having a plurality of small counter elements.

9. A system for identifying establishment of a connection between a source host with a source address (Src) and a destination host with a destination address (Dst) in a data network, comprising:
   a flow identification unit for calculating a flow descriptor unique to said connection based on connection set-up datagrams exchanged between said source host and said destination host;
   storage means, for storing said flow descriptor based on a relationship between said Src and Dst;
   an access interface to said storage means for providing a flow present indication if said flow descriptor is found in said storage means; and
   a controller for controlling operation of said descriptor calculating unit and said access interface and determining that said connection has been established based on said relationship and on said flow present indication,
   wherein said controller informs said access interface if the source address Src in said set-up datagram is greater than the destination address Dst.

10. A method for identifying establishment of a connection in a data network between a source host with a source address (Src) and a destination host with a destination address (Dst), comprising:
    detecting a first connection set-up datagram transmitted from said source host to said destination host and identifying said connection set-up datagram as a connection request;
    detecting a second connection set-up datagram transmitted from said destination host to said source host and identifying said second connection set-up datagram as a request acknowledged datagram;
    generating a connection established indication if both said connection request datagram and said request acknowledged datagram have been identified in this order
    wherein detecting a first connection set-up datagram comprises:
    providing a first container for tracking connections with Src >Dst and a second container for tracking connections with Src <Dst;
    determining if a source address $Src_1$ in said first connection set-up datagram is greater than a the destination address $Dst_1$ in said first connection set-up datagram;
    calculating a flow descriptor unique to said connection from said first connection set-up datagram; and
    storing said first flow descriptor in said first container if $Src_1>Dst_1$ and storing said first flow descriptor in said second container if $Src_1<Dst_1$.

11. The method of claim 10, further comprising triggering traffic flow monitoring activities of interest for the respective connection in response to said connection established indication.

12. The method of claim 10, wherein said detecting a second connection set-up datagram comprises:
    determining if a source address $Src_2$ in said second connection set-up datagram is greater than a destination address $Dst_2$ in said second connection set-up datagram;
    calculating a flow descriptor from said second connection set-up datagram; whenever $Src_2>Dst_2$, searching if said flow descriptor is already stored in said second container; and
    providing a flow present indication if said flow descriptor is already stored in said second container, confirming that said source host and destination host have exchanged said connection request and request acknowledge datagrams, wherein said flow present indication enables said generating a connection established indication.

13. The method of claim 12, further comprising storing said flow descriptor calculated from said second connection set-up datagram in said first container.

14. The method of claim 12, further comprising removing said flow descriptor calculated from said first connection set-up datagram from said second container.

15. The method of claim 10, wherein said detecting a second connection set-up datagram transmitted from said destination host to said source host and identifying said second connection set-up datagram as a request acknowledged datagram comprises:

determining if a source address $Src_2$ in said second connection set-up datagram is greater than a destination address $Dst_2$ in said second connection set-up datagram;

calculating a flow descriptor from said second connection set-up datagram;

whenever $Src_2 < Dst_2$, searching if said flow descriptor is already stored in said first container;

and providing a flow present indication if said flow descriptor is already stored in said first container, confirming that said source host and destination host exchanged said connection request and request acknowledge datagrams, wherein said flow present indication enables said generating a connection established indication.

16. The method of claim 15, further comprising storing said flow descriptor calculated from said second connection set-up datagram in said second container.

17. The method of claim 15, further comprising removing said flow descriptor calculated from said first connection set-up datagram from said first container.

18. The method of claim 10, further comprising removing all said flow descriptors from said first and second containers at predetermined intervals of time.

\* \* \* \* \*

UNITED STATES PATENT AND TRADEMARK OFFICE
CERTIFICATE OF CORRECTION

PATENT NO.       : 7,623,466 B2                                          Page 1 of 1
APPLICATION NO. : 11/407221
DATED            : November 24, 2009
INVENTOR(S)      : Bradley James Whitehead It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 716 days.

Signed and Sealed this

Fourteenth Day of December, 2010

David J. Kappos
*Director of the United States Patent and Trademark Office*